United States Patent
Kattan et al.

(10) Patent No.: US 9,084,491 B1
(45) Date of Patent: Jul. 21, 2015

(54) PORTABLE TRAY TABLE

(71) Applicant: Lindsay Kattan, Scottsdale, AZ (US)

(72) Inventors: Lindsay Kattan, Scottsdale, AZ (US); Roger Tipton, Twinsburg, OH (US); Justin Roebuck, Twinsburg, OH (US)

(73) Assignee: Lindsay Kattan, Scottsdale, AZ (US)

( * ) Notice: Subject to any disclaimer, the term of this patent is extended or adjusted under 35 U.S.C. 154(b) by 0 days.

(21) Appl. No.: 14/559,512

(22) Filed: Dec. 3, 2014

Related U.S. Application Data (60) Provisional application No. 61/916,966, filed on Dec. 17, 2013.

(51) Int. Cl.
*A47B 85/00* (2006.01)
*A47C 7/70* (2006.01)

(52) U.S. Cl.
CPC ........................ *A47C 7/70* (2013.01)

(58) Field of Classification Search
CPC .......... B60N 3/00; B60N 3/001; B60N 3/002; B60N 3/004; B60N 3/007; A47B 13/16; A47B 7/62; A47B 13/68; A47B 13/70; A47C 7/62; A47C 7/68; A47C 7/70
USPC ............... 108/25, 26, 44, 45; 206/219; 297/188.18, 188.16, 188.15, 188.14; 220/23.4; 248/311.2
See application file for complete search history.

(56) References Cited

U.S. PATENT DOCUMENTS

| | | | |
|---|---|---|---|
| 1,809,866 A | 6/1931 | Riesche | |
| D206,449 S * | 12/1966 | Terry | 108/44 |
| 3,880,485 A * | 4/1975 | Schmelzer | 312/282 |
| 4,466,659 A | 8/1984 | Carpentier et al. | |
| 4,795,211 A * | 1/1989 | Stern et al. | 297/188.18 |
| 4,852,499 A * | 8/1989 | Ozols | 108/44 |
| 5,046,433 A | 9/1991 | Kramer et al. | |
| 5,259,579 A * | 11/1993 | Schneider | 297/188.16 |
| 5,562,331 A * | 10/1996 | Spykerman et al. | 297/188.16 |
| 5,651,523 A * | 7/1997 | Bridges | 248/311.2 |
| 6,045,173 A * | 4/2000 | Tiesler et al. | 297/188.14 |
| 6,109,580 A * | 8/2000 | Stern et al. | 248/311.2 |
| 6,533,233 B2 * | 3/2003 | Thomas | 248/311.2 |
| 6,732,990 B2 | 5/2004 | Hudson | |
| 7,198,327 B2 | 4/2007 | Bergin | |
| 7,243,991 B2 * | 7/2007 | Ojeda | 297/188.14 |
| 7,290,746 B1 | 11/2007 | Macias et al. | |
| 7,293,507 B2 * | 11/2007 | DePue et al. | 108/44 |
| 7,341,005 B2 | 3/2008 | Baggott | |
| 7,748,536 B2 * | 7/2010 | Cassese et al. | 206/542 |
| 7,963,231 B2 * | 6/2011 | Osborne et al. | 108/44 |
| 2006/0032410 A1 | 2/2006 | Miller | |
| 2006/0220425 A1 * | 10/2006 | Becker et al. | 297/188.16 |
| 2008/0250983 A1 * | 10/2008 | Sundarrao | 108/44 |
| 2010/0319588 A1 * | 12/2010 | Hanna et al. | 108/44 |

* cited by examiner

*Primary Examiner* — Jose V Chen (74) *Attorney, Agent, or Firm* — Renner, Kenner, Greive, Bobak, Taylor & Weber (57) ABSTRACT

A portable tray table (10) includes a base (12) having a support base (14) that carries raised ends (15) and a plurality of tabletop supports (16). The tray (10) further includes a cup holder protrusion (20) including a sidewall (22) and an optional sleeve (24). A tabletop (32) is positioned in a tabletop opening (18) and is secured to the base (12) by locking push-in fasteners (44, 44') and securing protrusions (42). The tabletop (32) can move from a down position to an upward position to an opposite down position, and vice versa. The cup holder protrusion (20) is capable of fitting into an existing cup holder, particularly a cup holder on a seat back, in order to secure the portable tray (10) in a position for use as a tray table.

15 Claims, 6 Drawing Sheets

PORTABLE TRAY TABLE

CROSS-REFERENCE TO RELATED APPLICATION

This application claims the benefit of U.S. Provisional Patent Application Ser. No. 61/916,966 filed Dec. 17, 2013, entitled Portable Tray Table.

TECHNICAL FIELD

The present invention relates, in general, to a portable tray table. More particularly, this invention relates to a portable tray table that is intended to be used with a seat back that has an existing cup holder.

BACKGROUND OF THE INVENTION

Oftentimes trays are utilized to hold food and drinks. Some trays are designed to be affixed to a seat back in front of the user, such as at a sports arena or stadium. These trays generally include a means for affixing the tray to the seat back in front of the user. Such trays include those disclosed by U.S. Pat. No. 1,809,866 ('866 patent), U.S. Pat. No. 4,466,659 ('659 patent), U.S. Pat. No. 5,046,433 ('433 patent), and U.S. Pat. No. 7,341,005 ('005 patent).

However, in some of these prior art trays the means for attachment to a seat back that can interfere with a person sitting in the seat having the seat back. For example, the '659 patent discloses a tray holder that requires seat support members and a seat back-rest on the seat in front of the user, and the '433 patent discloses a tray apparatus that uses flexible mounting straps to attach the apparatus to the seat.

Also, other prior art trays are not easily affixable to a seat back, as they require screws or other such attachment mechanisms. For example, the '866 patent discloses a collapsible table that is attached using a screw or bolt, the '659 patent discloses a tray holder that utilizes fastening means, and the '005 patent discloses a concession tray that requires a bolt or other hardware in order to affix the tray to the seat back.

Other trays, such as those disclosed by U.S. Pat. Nos. 6,732,990, 7,198,327, and 7,290,746, are able to be placed into an existing cup holder. However, these trays are not particularly envisioned as being used for a seat back having an existing cup holder.

Thus, a need exists in the art for a portable tray table that offers one or more improvements over the known art. It is desirable to provide a portable tray table that is easily affixable to a seat back without disturbing a person sitting in the seat with the seat back that is holding the tray table. It is also desirable to provide a portable tray table having an improved design for providing a tray table that affixes to a seat back having an existing cup holder.

SUMMARY OF THE INVENTION

It is thus an object of one aspect of the present invention to provide a portable tray for use with a seat back having a cup holder.

It is an object of another aspect of the invention to provide a portable tray, as above, which does not interfere with a person sitting in a seat having a seat back.

It is an object of a further aspect of the present invention to provide a portable tray, as above, which does not require an intrusive attachment mechanism in order to be affixed to a seat back.

It is an object of an additional aspect of the present invention to provide a portable tray, as above, which is movable between opposed down positions such that it can be used with the cup holder in either the left position or the right position.

It is a still further object of the present invention to provide a portable tray, as above, which provides a securing sleeve for securing the tray in the cup holder of a seat back.

These and other objects of the present invention, as well as the advantages thereof over existing prior-art forms, which will become apparent from the description to follow, are accomplished by the improvements hereinafter described and claimed.

In general, a portable tray table made in accordance with the present invention is intended to be used in conjunction with a seat back having a cup holder. The tray table includes a base and a table top carried by the base. A cup holder is also carried by the base and is adapted to be received in the cup holder of the seat back.

In accordance with another aspect of the invention, a portable tray table for use with a seat back having a cup holder includes a base and a cup holder carried by the base and adapted to be received in the cup holder of the seat back. A table top is carried by the base and is pivotable from a first position wherein the table top extends from one side of the base to a second position wherein the table top extends from the other side of the base.

According to another aspect of the invention a portable tray table for use with a seat back having a cup holder includes a base which carries table tope supports. A cup holder is carried by the base and is adapted to be received in the cup holder of the seat back. A table top is pivotably carried by the base and is adapted to rest on the table top supports so that the table top is substantially horizontal when the cup holder is in the cup holder of the seat back.

A preferred exemplary portable tray table is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A portable tray table made in accordance with the present invention is indicated generally by the numeral 10 and includes a base generally indicated by the numeral 12. Base 12 includes support platform 14 that carries a plurality of tabletop supports 16. In a preferred embodiment, support platform 14 is generally rectangular and one tabletop support 16 is proximately located at each corner of support platform 14. Support platform 14 can be provided with raised ends 15 and open sides 17. Platform support 14, raised ends 15, tabletop supports 16, and open sides 17 form a tabletop opening, generally indicated by the numeral 18.

Base 12 further includes a cup holder protrusion, generally indicated by the numeral 20, proximately located to tabletop opening 18. Cup holder protrusion 20 can be carried by one of raised ends 15 of base 12. Base 12 can be manufactured as one piece, or cup holder protrusion 20 can be attachable to the one of raised ends 15 of base 12. Cup holder protrusion 20 includes a sidewall 22 and is intended to fit into an existing cup holder oftentimes found on the back of a seat in front of the user of tray table 10 in order to secure portable tray table 10 in a position for use.

Sidewall 22 is hollow, such that cup holder protrusion 20 can serve as a cup holder for a user of the portable tray table 10. When cup holder protrusion 20 is placed in a cup holder affixed to a seat back, cup holder protrusion 20 serves as both a cup holder and a support for the portable tray table 10. In one embodiment, cup holder protrusion 20 does not include a base such that a cup placed through sidewall 22 will rest on a base of the existing cup holder. In another embodiment, cup holder protrusion 20 includes a generally circular base 26, as seen in FIG. 8, upon which a cup may be placed.

Figure 8:
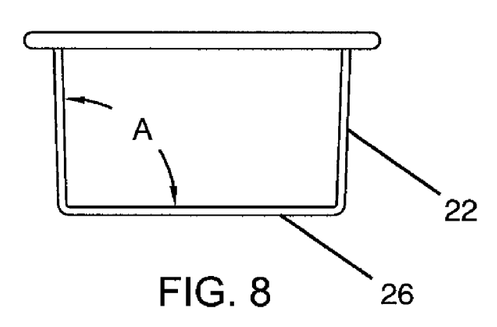
FIG. 8 is a view of the cup holder protrusion.
Figure 9:
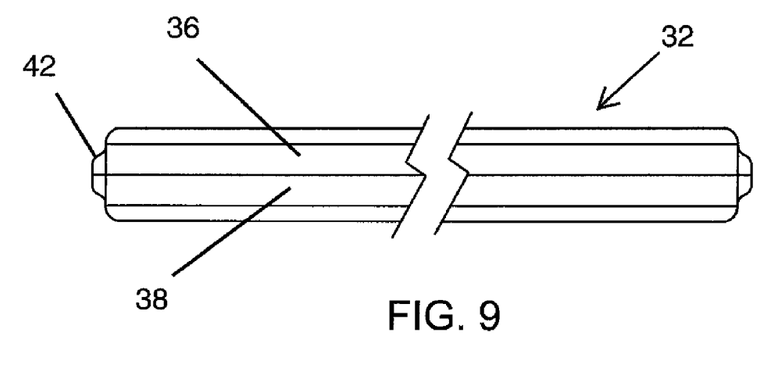
FIG. 9 is a fragmented view of the tabletop.

As seen in FIG. 8, sidewall 22 is positioned at an angle A with respect to base 26. Where base 26 is not provided, sidewall 22 is positioned at an angle A with respect to the horizontal axis of an existing cup holder. It is preferred that angle A is substantially similar to the corresponding angle of an existing seat-back cup holder such that cup holder protrusion 20 will fit securely into the existing cup holder. In preferred embodiments, angle A is an angle of 90 degrees or more, such as approximately 92.5 degrees.

When angle A is 90 degrees or approximate thereto, sidewall 22 will have a generally cylindrical shape. Where angle A is an angle other than 90 degrees or approximate thereto, sidewall 22 will have a frustoconical shape. The diameter of a shape formed by sidewall 22 will be smaller than the diameter of the existing cup holder that cup holder protrusion is to be placed into. It should be appreciated that when sidewall 22 forms a frustoconical shape, it will have varying diameters. In preferred embodiments, the diameters of the shape formed by sidewall 22 are in a range of from 2.5 inches or more to 3.5 inches or less. In other preferred embodiments, the smallest diameter of a frustoconically shaped sidewall 22 is in a range of from 3.0 inches to 3.1 inches and the largest diameter of a frustoconically shaped sidewall 22 is in a range of from 3.1 inches to 3.3 inches.

A sleeve 24 may optionally be provided to more securely fit cup holder protrusion 20 into an existing cup holder. Sleeve 24 is sized as to fit around sidewall 22 and to also fit into an existing cup holder. Sleeve 24 may be manufactured from a material that will securely engage both the sidewall 22 and the interior of an existing cup holder. Preferred materials for sleeve 24 include elastomeric or polymeric materials. A particularly preferred material for sleeve 24 is rubber.

Figure 12:
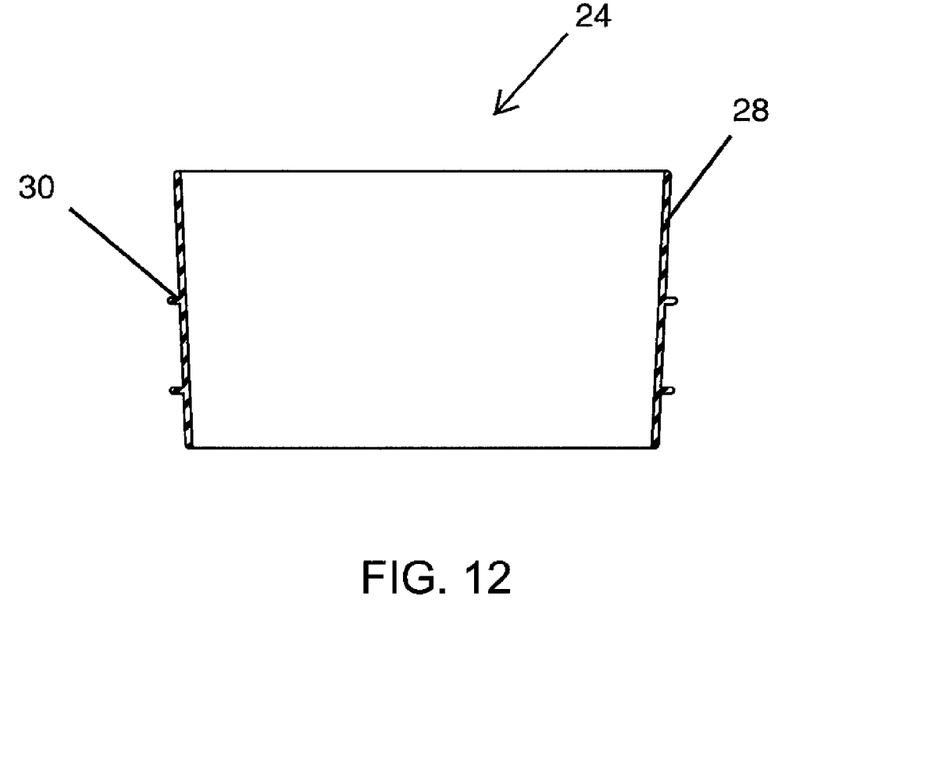
FIG. 12 is a sectional view of a sleeve.

Sleeve 24 includes sleeve sidewall 28 carrying one or more ribs 30 which encircle sidewall 28. As best shown in FIG. 12, ribs 30 are provided on the smaller diameter portion of a frustoconically shaped sidewall 28. Thus, ribs 30 further serve to securely engage the cup holder protrusion 20 with the interior of an existing cup holder.

Just as sidewall 22 has angle A, sleeve 24 also has an angle with respect to base 26, or where base 26 is not provided, sleeve 24 has an angle with respect to the horizontal axis of an existing cup holder. It is preferred that angle is substantially similar to the corresponding angle of an existing cup holder such that sleeve 24 will fit securely into the existing cup holder. In preferred embodiments, the angle of sleeve 24 is an angle of 90 degrees or more, such as approximately 92.5 degrees.

When the angle of sleeve 24 is 90 degrees or approximate thereto, sleeve 24 will have a generally cylindrical shape. Where the angle of sleeve 24 is an angle other than 90 degrees or approximate thereto, sleeve 24 will have a frustoconical shape. The diameter of a shape formed by sleeve 24 will be smaller than the diameter of the existing cup holder that cup holder protrusion is to be placed into. It should be appreciated that when sleeve 24 forms a frustoconical shape, it will have varying diameters. In preferred embodiments, the diameters of the shape formed by sleeve are in a range of from 2.5 inches or more to 4.0 inches or less. In other preferred embodiments, the smallest diameter of a frustoconically shaped sleeve 24 is in a range of from 3.1 inches to 3.3 inches and the largest diameter of a frustoconically shaped sleeve 24 is in a range of from 3.3 inches to 3.4 inches.

As previously described, support platform 14 with its raised ends 15, and tabletop supports 16, form tabletop opening 18 for positioning a tabletop 32 therein. Tabletop 32 is sized such that two corners of tabletop 32 fit into tabletop opening 18. Tabletop 32 has a generally rectangular shape and has substantially flat top and bottom surfaces 34 that can optionally include one or more images and/or words, such as an advertisement or team logo. Tabletop 32 can have one or more curved corners, as shown in the figures, for design or aesthetic purposes.

Figure 2:
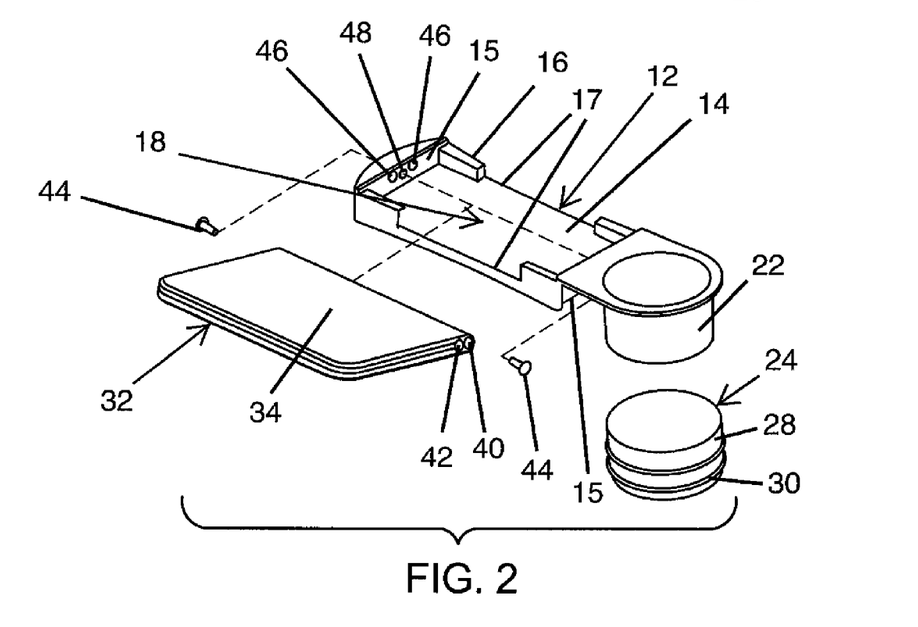
FIG. 2 is an exploded perspective view showing the components of the portable tray table.
Figure 3:
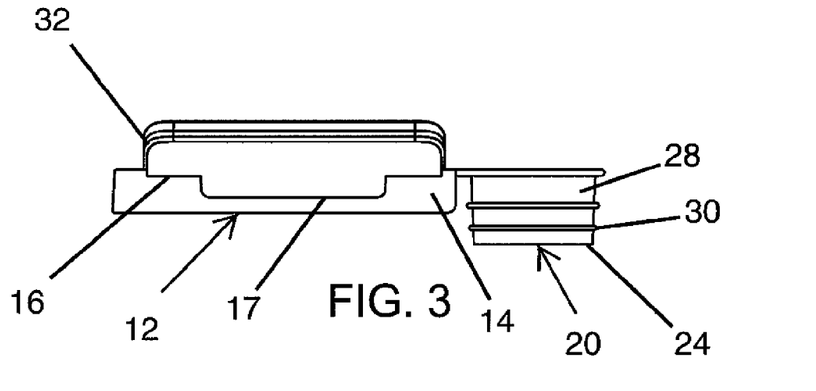
FIG. 3 is a front elevational view of the portable tray table.
Figure 4:
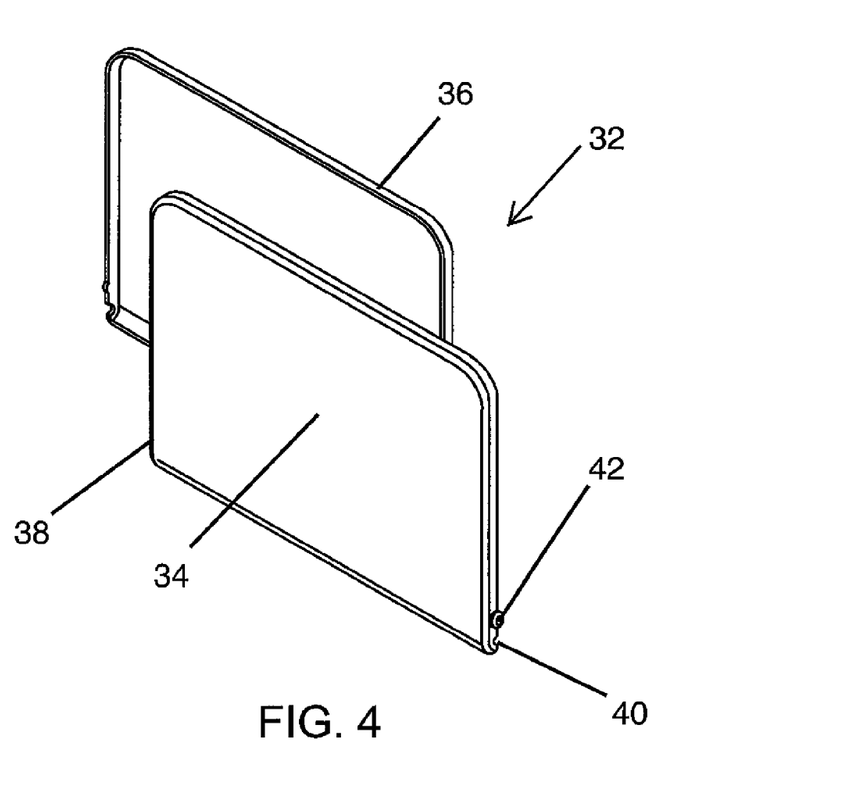
FIG. 4 is a perspective view showing an embodiment where a tabletop is assembled from two substantially identical pieces.
Figure 5:
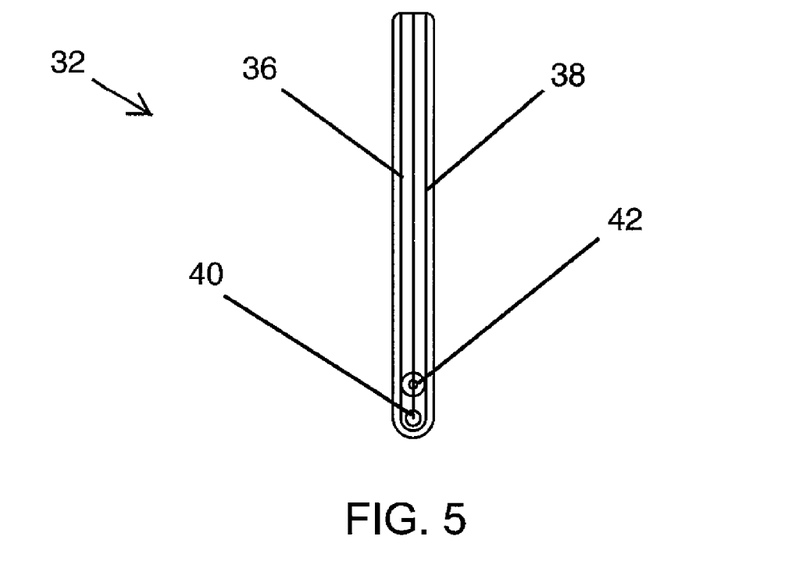
FIG. 5 is a side elevational view showing a tabletop assembled from two substantially identical pieces.
Figure 6:
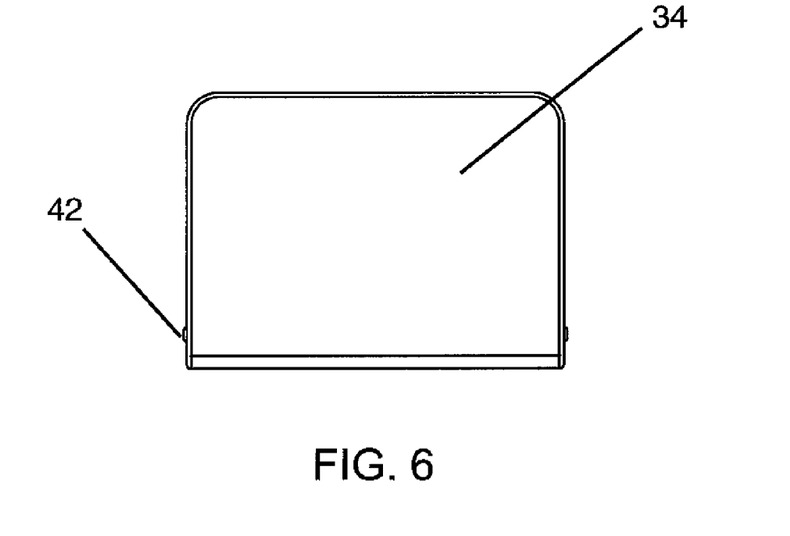
FIG. 6 is a top plan view of a tabletop.
Figure 7:
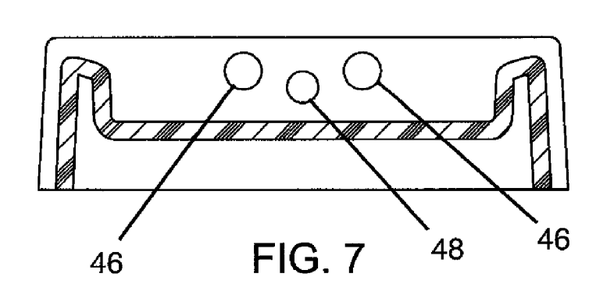
FIG. 7 is a sectional view of the base.

Tabletop 32 includes a hollow space therein where the amount of hollow space can be a manufacturing design decision with respect to stability of tabletop 32 or amount of material used to make tabletop 32. Tabletop 32 can be formed as one piece, such as by injection molding into the one piece shape as shown in FIG. 2. Tabletop 32 can also be made by combining, such as by heat pressing, a first element 36 with a substantially identical second element 38 (FIG. 4). Manufacturing tabletop 32 from two substantially identical elements can offer production benefits in that it may be easier to manufacture elements 36, 38 than to manufacture tabletop 32 as one piece.

Figure 10:
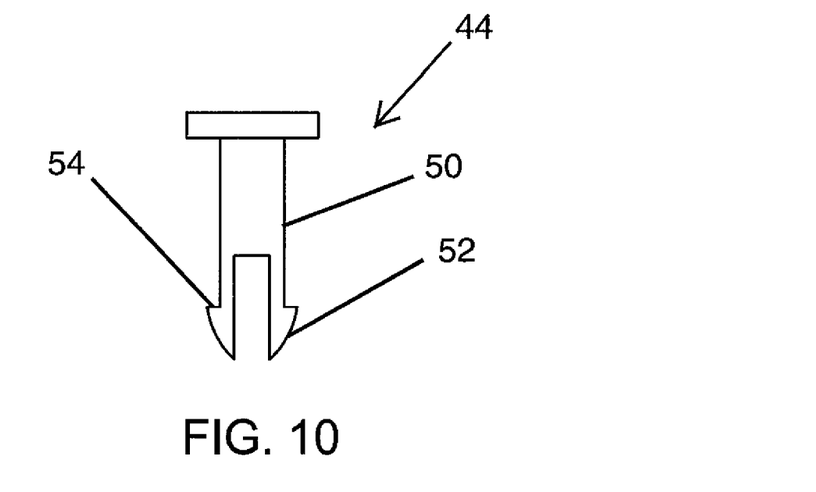
FIG. 10 is an elevational view of a locking push-in fastener.
Figure 11:
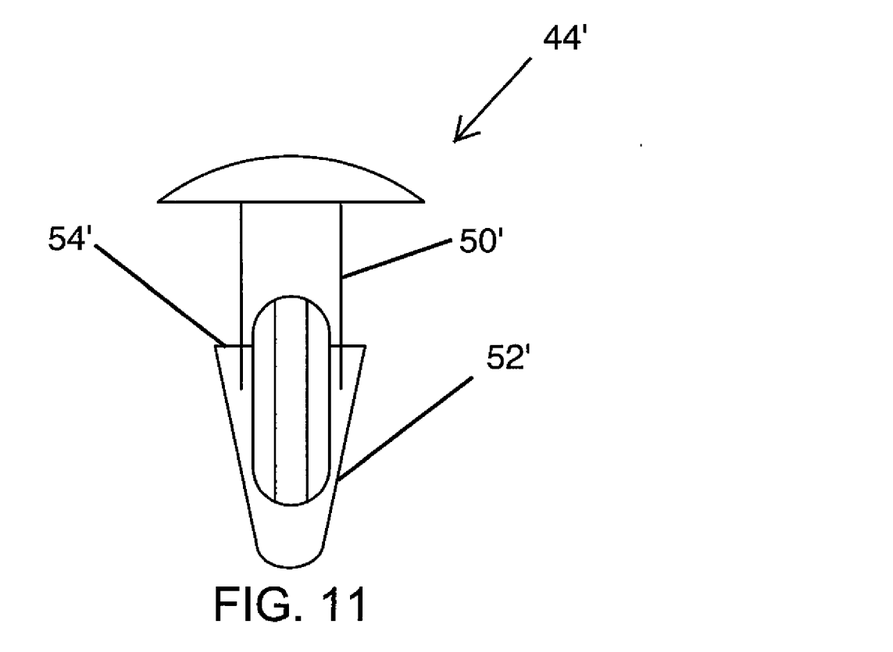
FIG. 11 is an elevational view of an alternate locking push-in fastener.

Tabletop 32 is provided with two locking push-in fastener holes 40 and two securing protrusions 42. Raised ends 15 include recessed holes 46 and locking push-in fastener holes 48 therein. As tabletop 32 contains an amount of hollow space, tabletop 32 can be connected to base 12 using locking push-in fasteners 44, 44' (FIGS. 10 and 11) and by aligning tabletop locking push-in fastener holes 40 with the base locking push-in fastener holes 48. Then, locking push-in fasteners 44, 44' fit through locking push-in fastener holes 48 and locking push-in fastener holes 40 in order to secure tabletop 32 to base 12. As shown in FIGS. 10 and 11, each locking push-in fastener 44, 44' includes a base 50, 50' and a locking push-in fastener portion having a tapered portion 52, 52' and a locking protrusion 54, 54'. Locking push-in fastener 44, 44' is received by locking push-in fastener hole 48 and locking push-in fastener hole 40. After the tapered portion 52, 52' enters through locking push-in fastener hole 48, it enters locking push-in fastener hole 40. Once the tapered portion 52, 52' is pushed through the holes, the locking push-in fastener base 50, 50' engages the circumferential edges of locking push-in fastener holes 48 and locking push-in fastener holes

40. Then, locking protrusion 54, 54' keeps tabletop 32 generally secured in the position of tabletop opening 18.

The push-in fasteners 44, 44' shown and other suitable locking push-in fasteners allow tabletop 32 to move from a down position to an upward position to the opposite down position, and vice versa. Suitable locking push-in fasteners should also keep tabletop 32 connected to base 12. If desired, tabletop 32 can be removed from base 12 by manipulating push-in fasteners 44, 44' such that they are removed from locking push-in fastener hole 48 and locking push-in fastener hole 40.

Base 12, tabletop 32, and fastener 44, 44' can be manufactured by thermoforming plastic into the desired shapes. It should be appreciated that these components can be manufactured using any suitable material and using any suitable manufacturing method.

Figure 1:
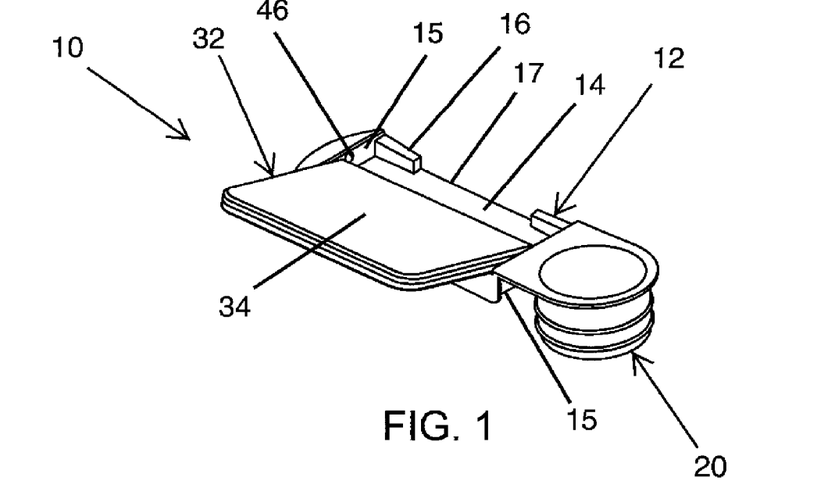
FIG. 1 is a perspective view of a portable tray table made in accordance with the present invention.

For further securing tabletop 32 into place, securing protrusions 42 are received in one set of recessed holes 46 when tabletop 32 is in a down position. Securing protrusions 42 and recessed holes 46 are shaped such that recessed holes 46 keep securing protrusions 42 in place until a suitable force is applied to move securing protrusions 42 from recessed holes 46. Such provides tabletop 32 in a more sturdy down position as shown in FIG. 1.

Tabletop 32 rests on tabletop supports 16 when tabletop 32 is in a down position. Since the cup holders of most seat backs are at a slightly slanted position with respect to the ground, the tabletop supports 16, and general design of portable tray table 10, will allow tabletop 32 to be substantially horizontal when placed in a down position with cup holder protrusion 20 in an existing cup holder of a seat back. That is, when cup holder protrusion 20 is placed in a cup holder that is slightly slanted with respect to the ground, if tabletop 32 did not include tabletop supports 16, then tabletop 32 would also be at the same slightly slanted position. When tabletop supports 16 are utilized, tabletop 32 rests on tabletop supports 16 in order to raise the position of tabletop 32 to a substantially horizontal position. It is also envisioned that tabletop supports 16 would not be needed where base 12 utilizes an offset angle for platform support 14 with respect to cup holder protrusion 20 to account for the slightly slanted position of the cup holder of a seat back.

It should be appreciated that tabletop 32 is able to move positions when a force is exerted thereon such that securing protrusions 42 can be moved to an upward position and can further be moved to the opposite down position when securing protrusions 42 engage the other set of the recessed holes 46. As such, tabletop 32 can be located on the other side of base 12. Based on this ability of tabletop 32 to move between opposing down positions, it should be appreciated that cup holder protrusion 20 can be aligned on either the right side of tabletop 32 or the left side of tabletop 32, depending on where the user desires portable tray table apparatus 10 to be positioned or where the existing cup holder is located on the seat back.

The down position of tabletop 32 can be used when a user wishes to place items thereon. The upright position can be utilized when a person wishes to walk past the portable tray table apparatus 10 or for moving the portable tray table apparatus 10.

Advantageously, portable tray tables that are used according to the concepts of the present invention are useful as beneficially providing a portable tray table that is easily affixable to a seat back without disturbing a person sitting in the seat with the seat back. Portable tray tables that are used according to the concepts of the present invention also provide a portable tray table that affixes to a seat back having an existing cup holder. Said portable tray tables offer several advantages over prior art forms as described above.

What is claimed is:

1. A portable tray table for use with a seat back having a cup holder comprising a base, a tabletop carried by said base, and a cup holder carried by said base and adapted to be received in the cup holder of the seat back, wherein said base includes a support platform carrying a plurality of tabletop supports and two raised ends, said plurality of tabletop supports and said raised ends forming an opening, a portion of said tabletop being pivotally carried within said opening.

2. The apparatus of claim 1, wherein said cup holder of the portable tray table includes a cylindrically shaped sidewall.

3. The apparatus of claim 1, wherein said cup holder of the portable tray table includes a frustoconically shaped sidewall.

4. The apparatus of claim 3, wherein said frustoconically shaped sidewall has an angle of from greater than 90 degrees to less than 95 degrees with respect to horizontal.

5. The apparatus of claim 3, wherein said cup holder of the portable tray table includes a cup holder base, wherein said frustoconically shaped sidewall has an angle of from greater than 90 degrees to less than 95 degrees with respect to said cup holder base.

6. The apparatus of claim 1, wherein said cup holder includes a sleeve positioned therearound for more securely fitting said cup holder into the cup holder of the seat back, said sleeve being made from an elastomeric or polymeric material.

7. A portable tray table for use with a seat back having a cup holder comprising a base, a cup holder carried by one end of said base and adapted to be received in the cup holder of the seat back, a single tabletop carried by said base and pivotable from a first position wherein said single tabletop extends from one side of said base to a second position wherein said single tabletop extends from the other side of said base.

8. The apparatus of claim 7, wherein said base includes one or more base fastener holes, and wherein said tabletop includes one or more tabletop fastener holes, and further comprising one or more fasteners to attach said tabletop to said base by being positioned in both said one or more base fastener holes and said one or more tabletop fastener holes.

9. The apparatus of claim 7, wherein said base includes a first pair of recessed holes and a second pair of recessed holes, wherein said first pair of recessed holes is adapted to receive a pair of securing protrusions of said tabletop when said tabletop is in the first position, and wherein said second pair of recessed holes is adapted to receive said pair of securing protrusions of said tabletop when said tabletop is in the second position.

10. The apparatus of claim 9, said base having a pair of raised ends, wherein said recessed holes are located in said raised ends.

11. A portable tray table for use with a seat back having a cup holder offset from horizontal comprising a base, tabletop supports carried by said base, a cup holder carried by said base and adapted to be received in the cup holder of the seat back, a tabletop pivotally carried by said base and adapted to rest on said tabletop supports so that said tabletop is offset at an angle relative to said base, whereby said tabletop is substantially horizontal when said cup holder of the portable tray table is in the cup holder of the seat back.

12. The apparatus of claim 11, wherein said base is a generally rectangular shape and includes one said tabletop support positioned at each corner.

13. The apparatus of claim 11, wherein said base includes one or more base fastener holes, and wherein said tabletop includes one or more tabletop fastener holes, and further comprising one or more fasteners attach said tabletop to said base by being positioned in both said one or more base fastener holes and said one or more tabletop fastener holes.

14. The apparatus of claim 11, wherein said base includes a first pair of recessed holes and a second pair of recessed holes, wherein said tabletop includes two securing protrusions, wherein said first pair of recessed holes is adapted to receive said securing protrusions of said tabletop when said tabletop is in the first position, and wherein said second pair of recessed holes is adapted to receive said securing protrusions of said tabletop when said tabletop is in the second position.

15. The apparatus of claim 11, wherein said cup holder includes a sleeve positioned therearound for more securely fitting said cup holder into the cup holder of the seat back, said sleeve being made from an elastomeric or polymeric material.

\* \* \* \* \*